(12) United States Patent
Suh et al.

(10) Patent No.: US 7,099,737 B2
(45) Date of Patent: Aug. 29, 2006

(54) INTELLIGENT STEP-NC CONTROLLER

(75) Inventors: Suk-Hwan Suh, Kyungsangbuk-do (KR); Sang-Uk Cheon, Kyungsangbuk-do (KR)

(73) Assignee: Postech Foundation, Kyungsangbuk-do (KR)

( * ) Notice: Subject to any disclaimer, the term of this patent is extended or adjusted under 35 U.S.C. 154(b) by 33 days.

(21) Appl. No.: 10/506,685

(22) PCT Filed: Jun. 4, 2002

(86) PCT No.: PCT/KR02/01054

§ 371 (c)(1),
(2), (4) Date: Sep. 20, 2004

(87) PCT Pub. No.: WO03/079123

PCT Pub. Date: Sep. 25, 2003

(65) Prior Publication Data

US 2005/0171629 A1 Aug. 4, 2005

(30) Foreign Application Priority Data

Mar. 20, 2002 (KR) .............................. 2002-14946

(51) Int. Cl.
G06F 19/00 (2006.01)
(52) U.S. Cl. .................. 700/174; 700/18; 700/104; 700/182; 703/6; 707/10

(58) Field of Classification Search .................. 700/18, 700/86, 95, 97, 104, 159, 165, 174, 181, 700/182; 703/6; 707/10
See application file for complete search history.

(56) References Cited

U.S. PATENT DOCUMENTS

| 5,255,200 | A | | 10/1993 | Torizawa et al. |
| 5,530,857 | A | * | 6/1996 | Gimza ........................ 707/10 |
| 5,991,528 | A | * | 11/1999 | Taylor et al. .................. 703/6 |
| 6,243,611 | B1 | * | 6/2001 | Hazama et al. ............... 700/97 |
| 6,290,571 | B1 | | 9/2001 | Dilger et al. |
| 6,411,862 | B1 | * | 6/2002 | Hazama et al. ............. 700/182 |
| 6,424,883 | B1 | * | 7/2002 | Hosokawa et al. ......... 700/181 |

* cited by examiner

*Primary Examiner*—Leo Picard
*Assistant Examiner*—Douglas S. Lee
(74) *Attorney, Agent, or Firm*—Bacon & Thomas, PLLC

(57) ABSTRACT

An intelligent STEP-NC (Standard for the Exchange of Produce model-Numerical Controller) overcomes shortcomings of conventional NCs with a closed structure The intelligent STEP-NC intelligently performs a machining process based on ISO 14649 data while autonomously coping with an emergency at a shop-floor. Thus, the discontinuity of information in a CAD-CAM-CNC chain where the current NCs are operated can be overcome and the concept of "design-to-manufacture" can be realized.

7 Claims, 7 Drawing Sheets

FIG.4A

Figure 1:
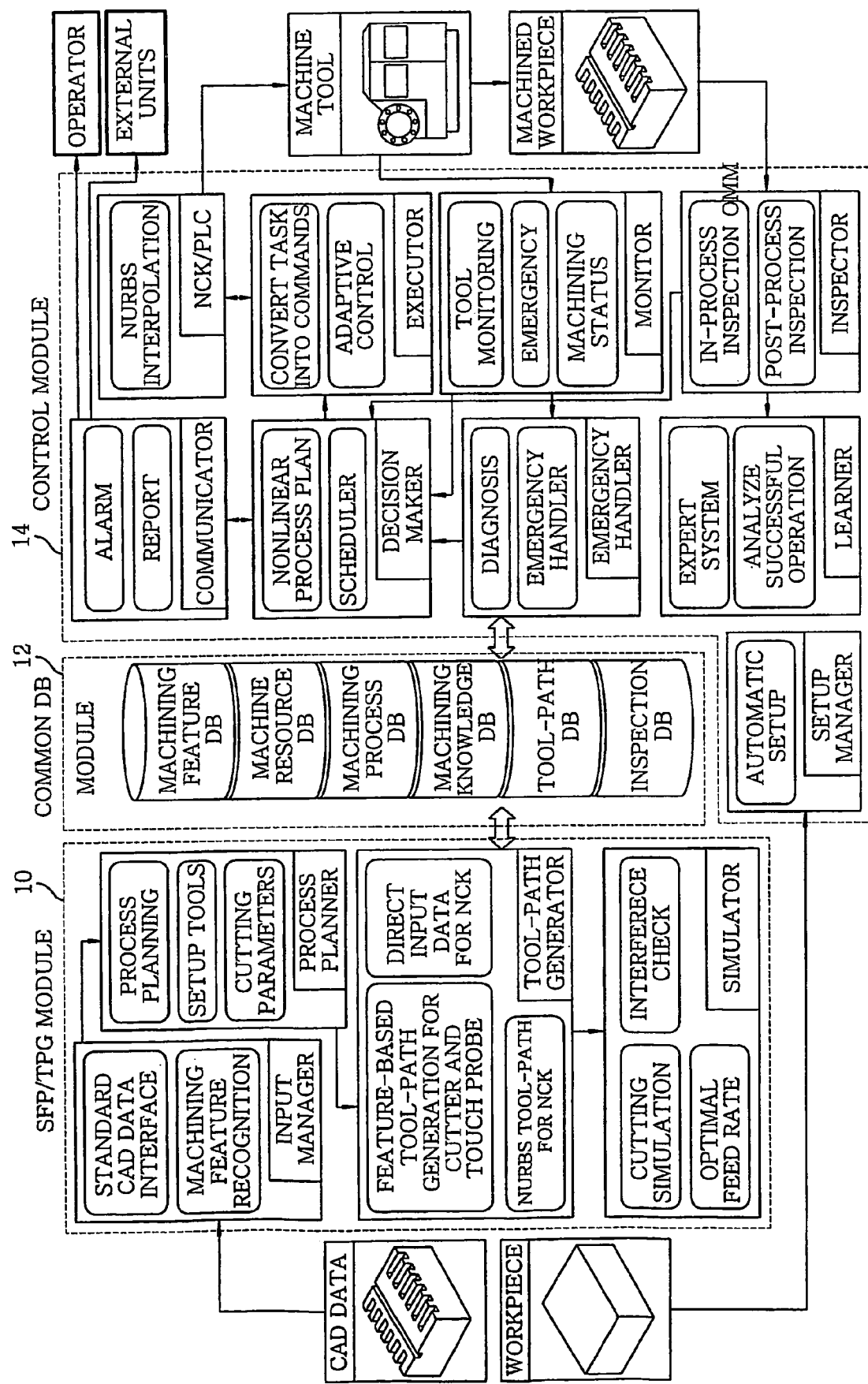

```
TYPE OMM_type=ENUMERATION OF
  (in_process_measurement,post_process_measurement);
END_TYPE ;

ENTITY OMM
  its_type :              OMM_type ;
  measurement_path :      tool_path ;
  measured_results :      user_defined_database ;
  desired_tolerance :     toleranced_length_measure ;
  design_surface          advanced_brep_shape_representation ;
END_ENTITY ;
```

FIG.4B

```
ENTITY monitoring
   ABSTRACT SUPERTYPE OF (monitoring)
END_TYPE ;

TYPE mornitoring_sensor_type=ENUMERATION OF(
   dimensional_sensor,cutting_force_sensor,feed_force_sensor,
   spindle_motor_sensor,acoustic_emission_sensor) ;
END_ENTITY ;

TYPE mornitoring_target_type=ENUMERATION OF(
   dimensional_check,tool_wear,tool_breakage) ;
END_ENTITY ;

ENTITY tool_monitoring
   SUBTYPE OF (monitoring) ;
     its_sensor :          monitoring_sensor_type ;
     its_target :          monitoring_target_type ;
END_ENTITY ;
```

FIG. 4C

```
ENTITY adaptive_control
    its_sensor :              monitoring_sensor_type ;
    max_torque :              OPTIONAL REAL ;
    max_cutting_force :       OPTIONAL REAL ;
    its_control_algorithm :   OPTIONAL REAL adaptive_control_algorithm ;
END_ENTITY ;

FUNCTION adaptive_control_algorithm
        :
END_ENTITY ;
```

INTELLIGENT STEP-NC CONTROLLER

FIELD OF THE INVENTION

The present invention relates to an intelligent STEP-NC (Standard for the Exchange of Product model-Numerical Controller) controller.

BACKGROUND OF THE INVENTION

Some among various techniques for modularizing a NC (numerical controller) are OSACA (Open System Architecture for Controls within Automation systems) in Europe, OMAC (Open Module Architecture Controls) in U.S., OSEC (Open System Environment for Controllers) in Japan, etc. Prior arts concerned with these techniques are introduced in a paper directed to a holonic NC based on a holonic manufacturing paradigm (Kurth 1994, Suh et al. 1998); to a TRUE-CNC serving as a NC system having a CAD, a CAPP, a CAM, a CNC (Computer-based Numerical Control), a monitoring and a verifying function (Yamajaki et at. 1997); and to a production cell based on a programming interface (Brouer et al. 1997), etc. These conventional techniques are developed to overcome a closed structure of prior NCs. However, they do not specify therein a module and its structure for realizing an intelligent NC controller.

SUMMARY OF THE INVENTION

It is, therefore, an object of the invention to provide an intelligent STEP-NC (Standard for the Exchange of Product model-Numerical Controller) capable of performing a machining process based on an ISO 14649 data model while effectively coping with an emergency at a shop-floor, thereby overcoming discontinuity of information in a CAD-CAM-CNC chain and realizing a "design-to-manufacture" concept in the true sense.

In accordance with the present invention, there is provided an intelligent STEP-NC including a control module for reflecting functional level requirements of each controller of a machining tool; a SFP/TPG module for reflecting data interface level requirements; and a common DB module for storing therein data generated, updated and referred to by the control module and the SFP/TPG module.

The present invention describes a method for designing and operating a controller based on an analysis of problems or requirements in a functional aspect and a data interface as well as an implementational aspect at a shop-floor.

The most important function of the CNC is to control a machining process to precisely machine a targeted feature by a cutting process. The main interest of the intelligent STEP-NC resides in accomplishing a machining goal by effectively coping with varying conditions at the shop floor. The present invention pursues the realization of such an intelligent STEP-NC by considering self-operated functions, interactions with an operator, an error recovery, a quality control, a resource management, learning, and cooperative functions.

Software elements constituting the intelligent STEP-NC controller are self-operated without a detailed direction from the operator. Further, in order to minimize directions from the operator and interactions between the operator and the controller, the operator's interference in the controller is minimized and tasks allotted to the operator are clearly distinguished from those allotted to the controller. The intelligent STEP-NC controller is capable of handling unexpected errors or changes occurring during a machining process. As for the quality control, an OMM (on-machine measurement) is performed and a proper diagnosis is provided in order to minimize geometric errors between designing features and machining features. For the sake of an optimum machining of a targeted feature, cutting parameters are set to be variable depending on machining conditions rather than fixed. In the matter of the resource management, all the resources included in the machining process are managed and controlled. The intelligent STEP-NC is capable of performing a high-speed machining process without deteriorating a luminous intensity of a surface of a machined feature. Further, the intelligent STEP-NC can acquire machining knowledge and add the acquired knowledge to a knowledge base so as to improve the performance efficiency of the controller.

The technical essence of the intelligent STEP-NC controller lies in overcoming a shortcoming of a G-code input in a conventional NC and improving a limited data processing efficiency of the conventional NC. That is, the key technology of the intelligent STEP-NC controller relates to a data interface between the CAM and the CNC and, also, to a data processing within the CNC. To achieve the above technical goal of the intelligent STEP-NC controller, the present invention considers a standard schema, a CAD data interface, an Internet interface, a process planning, a tool-path generation and a machining simulation. In the intelligent STEP-NC controller, the controller directly receives a CAD data so as to utilize geometric information which is lost in the CAD-CAM-CNC connection. Reflected in implementing an interface between the CAM and the CNC are an ISO 10303 data model serving as an international standard in a manufacturing field for expressing a component model, an ISO 13399 for defining cutting tools and an ISO 14649 data model serving as a NC data standard. Control software of the intelligent STEP-NC controller performs a remote control through the Internet and provides a function of monitoring the controller. In case a part program generated by the CAD/CAM system is modified at the shop-floor, problems may occur due to the inconsistency of the data. In order to avoid such problems, the intelligent STEP-NC controller enables a bi-directional data communication between the CAM and the CNC. The intelligent STEP-NC controller establishes a process plan and generates a tool-path on the basis of the prepared process plan. The controller for autonomously generating the tool-path may have a feature-based design data as an input thereto. Before the actual machining process, the intelligent STEP-NC controller simulates the machining process to find a possible error and verify the tool-path.

The intelligent STEP-NC controller is an open type controller having a software-based structure, which can be customized by the operator. All control modules, except an interface board for connecting the controller to hardware (a driver, a motor and a machining tool), in an operating system widely employed on a PC platform are implemented on a software basis. Further, since the controller is designed to have the open type architecture, the operator can access and modify the internal functions of the controller. Furthermore, since the intelligent STEP-NC uses a software-based module structure design, the operator can readily restructure the modules of the controller, in which case the whole program of the controller need not be recompiled and each module is operated on a plug-and-play basis.

BRIEF DESCRIPTION OF THE INVENTION

Figure 2A:
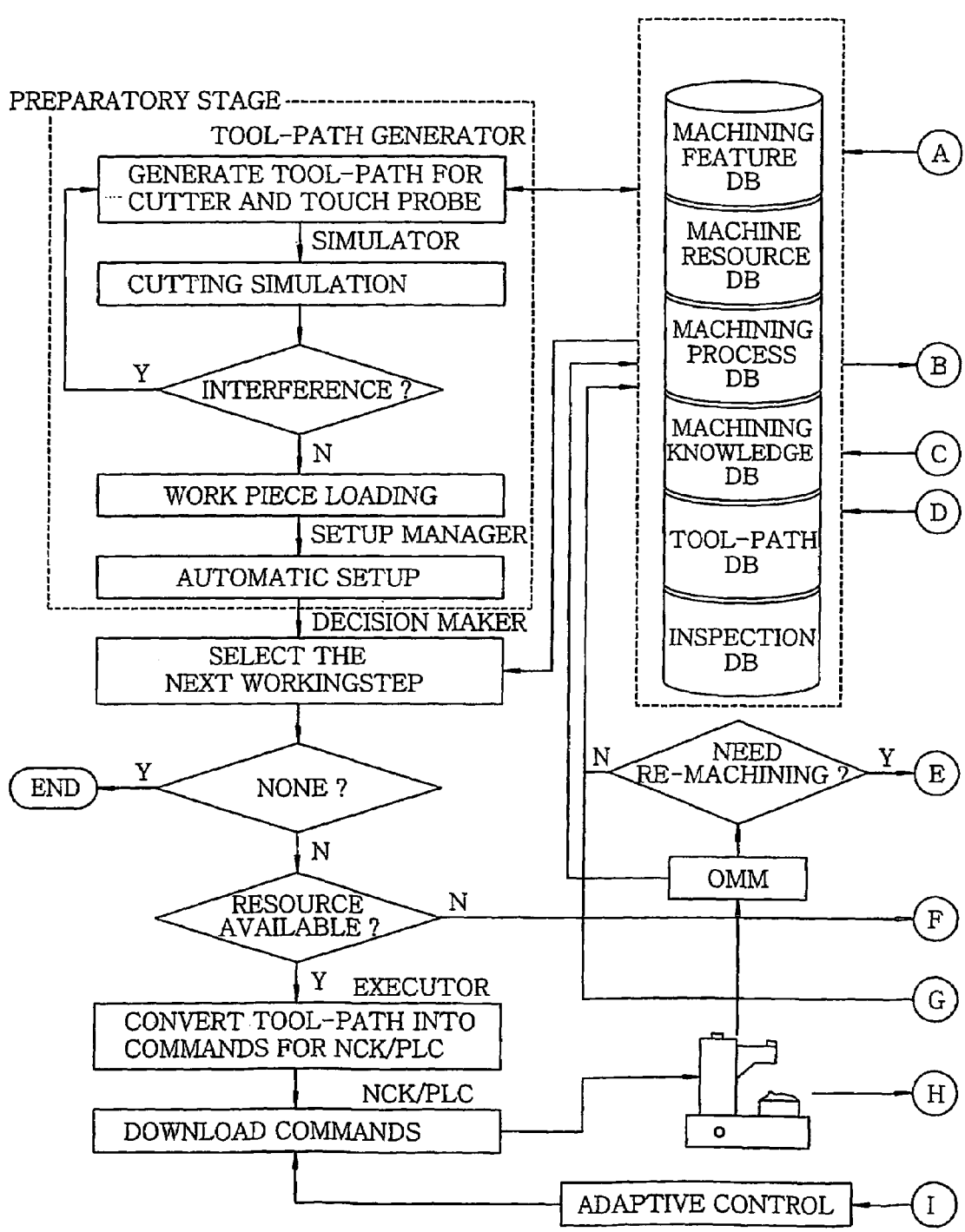
Figure 2B:
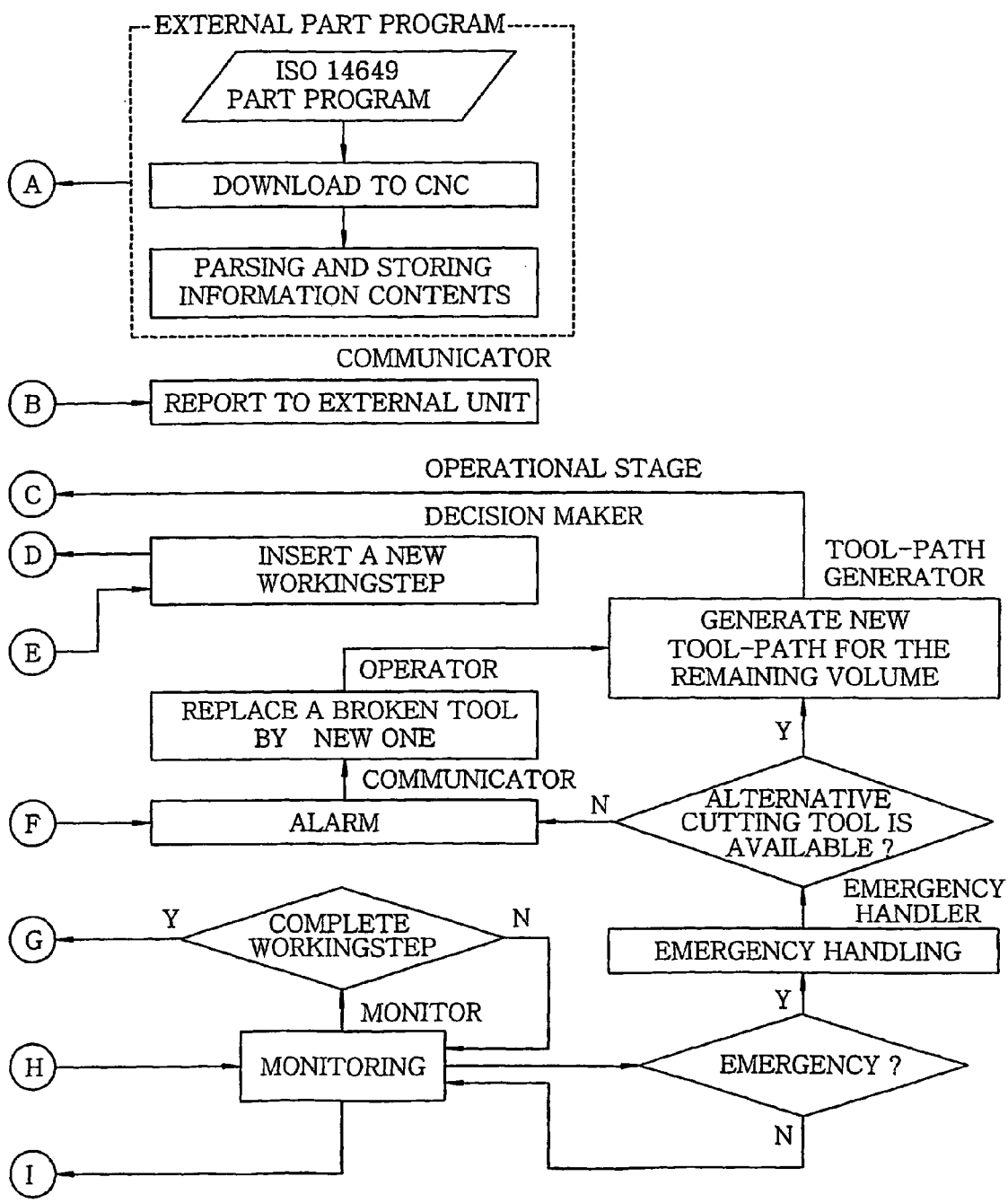
Figure 3A:
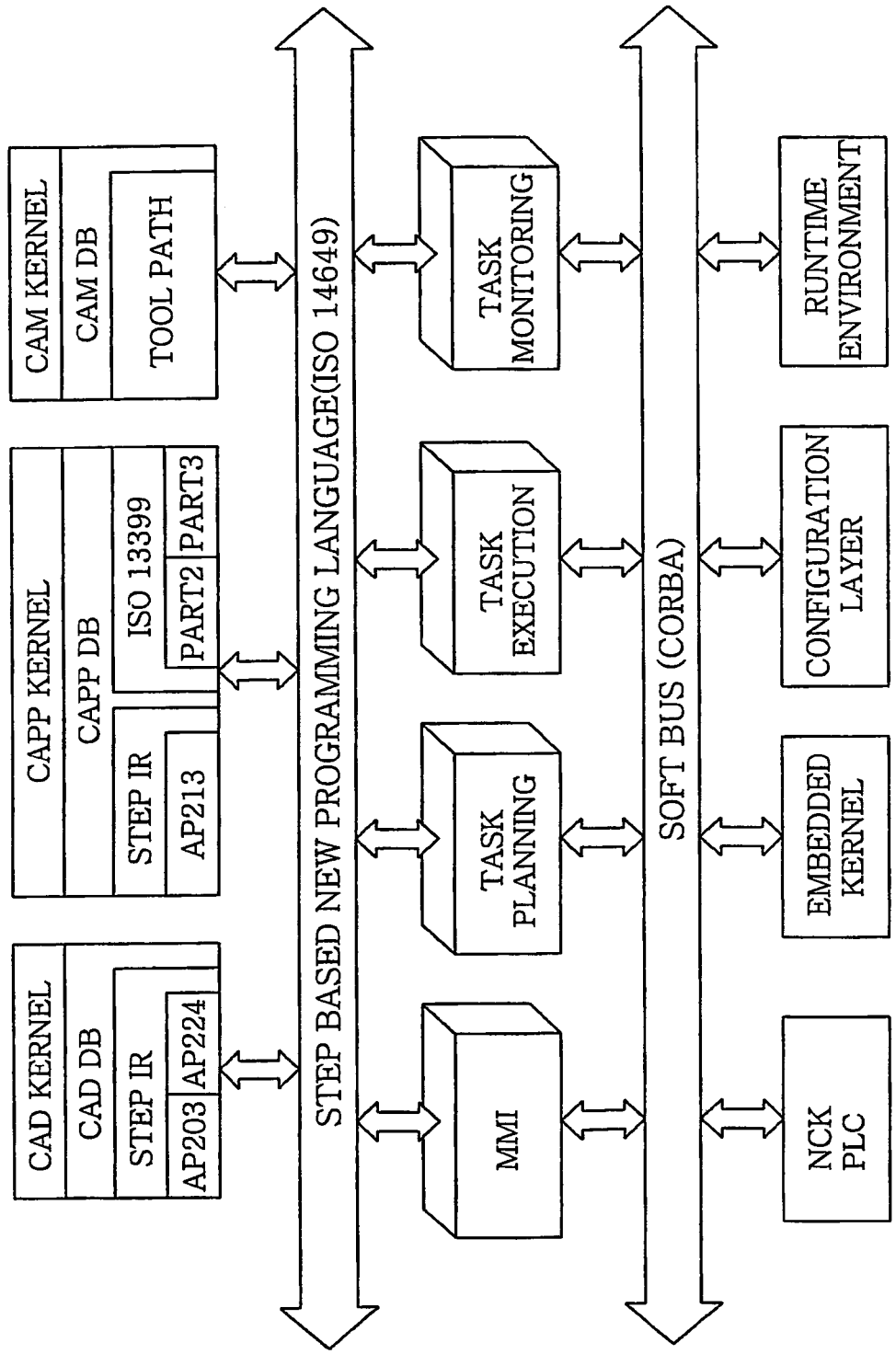
Figure 3B:
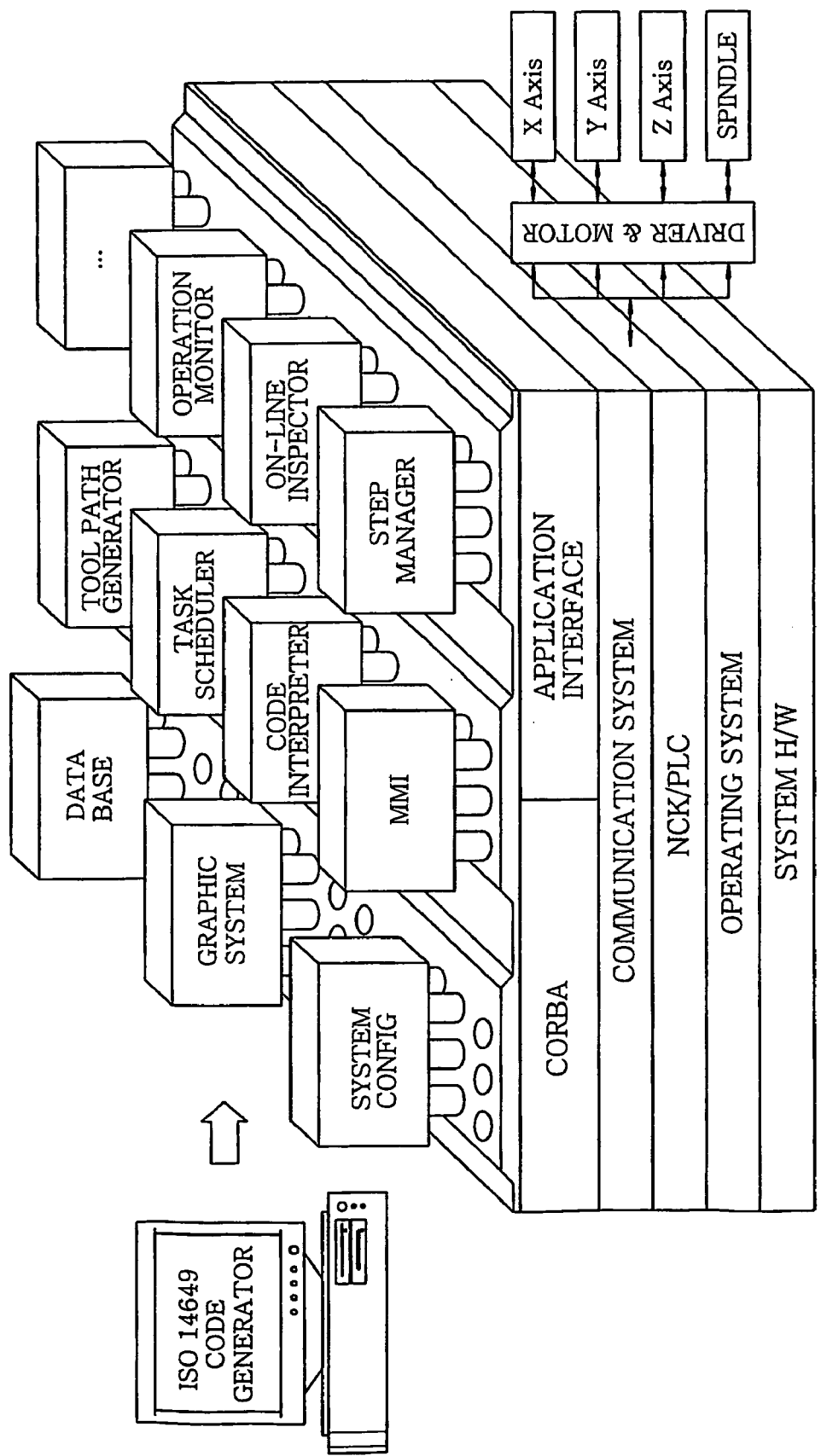

The above and other objects and features of the invention will become apparent from the following description of preferred embodiments given in conjunction with the accompanying drawings, in which:

FIG. 1 is a block diagram of an intelligent STEP-NC controller in accordance with a preferred embodiment of the present invention;

FIGS. 2A and 2B describe a process for operating an intelligent STEP-NC controller in accordance with the present invention;

FIGS. 3A and 3B illustrates a process for developing an intelligent STEP-NC controller in accordance with the present invention; and FIGS. 4A to 4C offer a data model for a measurement, a monitoring and an adaptive control in an intelligent STEP-NC controller in accordance with the present invention.

DESCRIPTION OF SPECIFIC EMBODIMENTS

Referring to FIG. 1, there is provided a block diagram of an intelligent STEP-NC controller in accordance with a first embodiment of the present invention. The intelligent STEP-NC controller includes a SFP (shop-floor programming)/TPG (tool-path generation) module 10, a common database module 12 and a control module 14.

The control module 14 reflects functional-level requirements of each of controllers of a machining tool, wherein the controllers constitute the machining tool based on a holonic paradigm including a decision-making, an execution and a monitoring stage.

The control modules 14 includes a decision maker for managing an intra-task, an executor, a monitor, an emergency handler, a plurality of modules for supporting non-machining functions such as a NCK/PLC (Numerical Control Kernel/Programmable Logic controller), a communicator for managing an inter-task, an inspector, a learner and a setup manager.

The setup manager within the control module 14 supports a setup of a workpiece. Once the workpiece is placed on the machining tool, the setup manager moves a touch probe by using geometric information of the workpiece and a jig to find a setup reference position.

The decision maker determines a working sequence based on a diagnosis result provided from the emergency handler, a monitoring result received from the monitor and an inspection result sent from the inspector. The decision maker selects the next process among various alternative plans of a non-linear type. The non-linear process plan includes a selective process plan and can be expressed by an "AND-OR" graph. It is one of the most important tasks of the decision maker to set priority between a planned process and a process demanded by the emergency handler.

The executor converts a task provided from the decision maker into a command and transfers the converted command to the NCK/PLC. If the task is concerned with a machining process, the executor brings the NCK/PLC a corresponding tool-path from a tool-path database (DB) within the common DB modules 12. If the task is directed to a tool exchanging process, on the other hand, the executor searches a tool magazine to find an alternative tool and, then, provides the found alternative tool to the NCK/PLC. Further, the executor stores therein a command performed by the NCK/PLC for an adaptive control. FIG. 4C illustrates a data model for the adaptive control.

The NCK/PLC modules are for directly operating the machining tool. The NCK interprets a tool-path command provided from the executor and performs the command by driving a servo-mechanism. The PLC performs a machining tool command concerned with, e.g., a tool exchange and a loading/unloading of the workpiece. Further, for the sake of a free form curve machining, the NCK supports NURBS interpolation to thereby realize a high-speed machining of the workpiece by using a small amount of data.

The monitor continuously monitors the whole machining status by using information from sensor signals and, then, provides the monitoring result to the emergency handler or the decision maker. FIG. 4B illustrates a data model for monitoring. A tool-monitoring and an emergency detection are key functions of the monitor.

If an emergent situation is reported by the monitor, the emergency handler diagnoses the emergency to determine how to handle the emergency. The diagnosis result is delivered to the decision maker, which is in charge of making a final decision and scheduling. For example, if the emergency is related to a damage of a tool, the emergency handler retreats the damaged tool and checks whether there exists an alternative tool in the tool magazine by using the machining resource DB. If the alternative tool is found, the machining process is resumed by using the found alternative tool. If the alternative tool is not found, however, the emergency handler notifies the decision maker of such a result and waits for a final decision of the decision maker. As can be seen from the above description, the emergency handler may be considered as a special type of decision maker for only dealing with an emergent situation.

The inspector automatically performs both an in-process inspection and a post-process inspection on the machining tool by using an OMM (on-machine measurement) and provides the inspection results to the decision maker. The in-process inspection result is delivered to the learner as well. FIG. 4A illustrates a data module for the OMM. The inspector generates a tool-path for the touch probe and stores the tool-path data in an inspection DB. The inspector also calculates a geometric error between a design feature and a corresponding machining feature by comparing the inspection DB and a machining feature DB.

The learner analyzes the in-process information obtained from the inspector by using an expert algorithm and, then, stores the analyzed information in a machining knowledge DB.

The communicator interacts with external units such as the CAD/CAM system, a shop-floor control system and an operator. If the CAD/CAM system raises a request, a controller transmits to the CAD/CAM system a part program stored in a current controller DB. If the shop-floor control system sends a request, the controller makes a report on machining status and problems that occurred during the machining process. Further, if it becomes impossible to process a certain task because of an unexpected problem, the communicator notifies the operator of the problem.

The SFP/TPG module 10 reflects data interface level requirements of the controller. The SFP/TPG module 10 incorporates a function of a CAM into a SFP system based on the STEP-NC data model.

The SFP/TPG module 10 includes an input manager, a process planner, a tool-path generator and a simulator.

The input manager within the SFP/TPG module 10 converts a standard CAD data (STEP AP203) into an internal feature modeling kernel data, recognizes a machining feature, extracts a property value of the machining feature and stores the extracted property value in the machining feature DB in the common DB modules 12.

The process planner receives from the input manager the property value of the machining feature and determines a process sequence, a machining task, a jig, a setup and a cutter that are required for the manufacturing of the machining feature. Thus determined information is stored in the machining process DB. The process sequence is expressed as one of nonlinear process plans and the decision maker selects a proper one among the nonlinear process plans during the machining process. An optimum cutting parameter, a machining strategy and the cutter is determined by using the machining knowledge DB. To this end, a knowledge-based process planning system is required.

The tool-path generator receives from the process planner the planned data. Then, the tool-path generator generates a tool-path for machining and measurement, and stores the generated tool-path in a tool-path DB. The generated tool-path is a complete one including connection paths between an approach path, a retract path, a machining path and a measurement path. The tool-path is stored in the tool-path DB which is accessible by the NCK/PLC. Since the NCK/PLC can interpret a NURBS curve, the tool-path generator need not divide the tool-path for free form curves into segments or arcs.

The simulator receives the generated tool-path from the tool-path generator and performs a cutting simulation before an actual machining process starts in order to verify the generated tool-path and find possible errors therein. The simulator detects through the cutting simulation an undercut or an over-cut of a feature and a tool interference. In addition to the error detection, the simulator calculates an optimal cutting rate by using a workpiece removal rate during a solid cutting simulation. The simulation results are stored in the tool-path DB and the machining process DB.

The common DB modules 12 store therein the data generated, updated and referred to by the control modules 14 and the SFP/TPG modules 10.

The common DB modules 12 include the machining feature DB, the machine resource DB, the machining process DB, the machining knowledge DB, the tool-path DB and the inspection DB. The machining feature DB, the tool-path DB and the inspection DB are short-term databases while the machine resource DB and the machining knowledge DB are long-term databases. When a part machining is completed, the short-term databases are removed.

The machining feature DB within the common DB modules stores therein the machining feature information generated by the input manager. The stored data serves as a feature-based input for the process planner.

The machine resource DB stores therein information upon a structure of a machine, available tools, a tool magazine, a jig and a sensor. The machine resource DB is updated by the operator or the decision maker.

The machining process DB store therein a nonlinear process plan generated by the process planner. The machining process is expressed by using the machining features, the machining operations, the machining strategy, the cutting parameter and the tools.

The machining knowledge DB interacts with the expert system to store therein long-term machining knowledge for use in the process planner and the executor. The machining knowledge DB is updated by the learner.

The tool-path DB stores therein the tool-path generated by the tool-path generator. The tool-path DB can be accessed by the NCK/PLC and the simulator.

The inspection DB stores therein the tool-path for the measurement as well as the result measured by the inspector.

Referring to FIGS. 2A and 2B, there is described a process for operating the intelligent STEP-NC in accordance with the present invention. The intelligent STEP-NC controller is not completely automated but operated by interactions with the operator. The STEP-NC operational process is divided into two stages, a part programming stage and a CNC operation stage.

A feature designer designs a feature to be manufactured by employing a CAD system that supports an AP203 data model. The designed feature is provided to a process designer. That is, the designed feature data is delivered to an off-line CAM system, i.e., an external SFP system or a SFP system installed within the intelligent STEP-NC.

In the SFP system, the input manager recognizes machining features based on the AP203 file inputted thereto. The recognized machining features are stored in the machining feature DB.

The process planner sets up a machining operation for each of the machining features and, then, determines a machining method, a machining strategy, a cutter and a cutting parameter for each of the machining operation. These process plans are based on ISO 14649 data model.

Based on the recognized machining features, the user sets the sequence of workingsteps. The cutting parameter is determined on the basis of a reference value recommended by the knowledge-based system and, if required, an adaptive control mode is set up.

However, a tool-path for each of the workingsteps is not defined because the tool-paths are to be generated by an intelligent CNC. The user specifies an inspection task on a PSG (process sequence graph) which displays the process plan.

If an input is provided from the user, the SFP system automatically creates an ISO 14649 part program.

However, in case the built-in SFP system is employed, it becomes unnecessary to produce the part program because all necessary input information is stored in the DBs of the controller. Further, in case the input from the user is not the STEP AP type CAD data but an ISO 14649 part program, the input is downloaded to the intelligent STEP-NC through the Internet or a DNC.

The intelligent STEP-NC interprets the ISO 14649 part program and stores the interpreted information in a corresponding DB. If the part program is produced by a built-in SFP prepared in the controller, the interpretation of the part program becomes unnecessary.

The tool-path generator of the controller generates a tool-path for a cutter and a touch probe, respectively, and the generated tool-paths are visualized and verified by the simulator. Then, the calculated tool-paths are utilized as a reference tool-path for the machining operations. Although the tool-paths are preferably generated before the machining operations, it is also possible to create the tool-paths during the machining operation in an emergency situation caused by, e.g., a broken or worn-out tool.

By pushing a start button after a workpiece is loaded, the machining operation starts. First, a setup manager automatically searches for a reference position by using the touch probe. Then, the decision maker selects the next workingstep according to the PSG that represents the non-linear process plan. If all specified resources, e.g., tools, required for the selected workingstep are available, the decision maker commands the executor to perform the selected workingstep. Then, the executor accesses the tool-path DB and loads a corresponding tool-path. Thereafter, the executor converts the tool-path into a command for NCK/PLC and calls the adaptive control mechanism to set a variable cutting parameter.

Meanwhile, the operation is continuously monitored by the monitor. In case a broken tool is detected, the monitor stops the operation and drives an emergency handling mechanism. Concurrently, the monitor informs the decision maker of the emergency. The decision maker checks whether an available alternative tool exists in the machining resource DB. If the alternative tool is found, the decision maker commands the tool-path generator to create a new tool-path for the remaining volume. The size of the alternative cutter may be different from that of the original cutter. On the other hand, if no alternative tool is found in the machining resource DB, the decision maker notifies the communicator that the corresponding workingstep cannot be conducted. Then, the communicator gives an alarm to the operator to request a new cutter. In the meanwhile, the decision maker attempts to find an alternative process sequence according to the non-linear process plan. If the alternative process plan is found, the decision maker selects the next workingstep and directs the tool-path generator to generate a tool-path.

The tool-path generator inspects the validity of tool-paths in the tool-path DB and produces a new tool-path if required. If the next workingstep is concerned with measurement, the decision maker orders the inspector to perform a required process, i.e., to measure a target area and store the measured data in the inspection DB. Then, the inspector estimates a geometric error between the machining feature DB data and the inspection DB data. If the estimated error goes beyond an allowable error range, the inspector reports to the decision maker that re-machining is demanded. In such a case, the decision maker adds a new workingstep for the re-machining.

If one workingstep is completed, the decision maker updates the PSG of the machining process DB, the machine resource status information of the machining resource DB, and the machining knowledge DB according to the operation result. Thereafter, the decision maker selects the next workingstep. This process is repeated until the all workingsteps are completed. Further, the decision maker directs the communicator to send current operational status information to the shop floor control system whenever the shop floor control system requests such information.

Referring to FIGS. 3A and 3B, there are provided a conceptual drawing and a block diagram, respectively for illustrating a development of the intelligent STEP-NC in accordance with the present invention.

While the invention has been shown and described with respect to the preferred embodiments, it will be understood by those skilled in the art that various changes and modifications may be made without departing from the spirit and scope of the invention as defined in the following claims.

What is claimed is:

1. An intelligent STEP-NC comprising:
a control module for reflecting functional level requirements of each controller of a machining tool;
an SFP/TPG module for reflecting data interface level requirements; and
a common DB module for storing therein data generated, updated and referred to by the control module and the SFP/TPG module,
wherein the control module includes:
a decision maker for determining a sequence of workingsteps based on a diagnosis result, a monitoring result and an inspection result;
an executor for converting a task sent from the decision maker into a command, delivering the converted command to an NCK/PLC (Numerical Control Kernel/Programmable Logic Controller), and memorizing the command performed by the NCK/PLC for an adaptive control; and
a monitor for continuously monitoring the whole machine and machining status, and transferring the monitored result as the monitoring result to an emergency handler or the decision maker, wherein the emergency handler diagnoses an emergency when the emergency is reported from the monitor and, then, provides the diagnosed result as the diagnosis result to the decision maker.

2. An intelligent STEP-NC comprising:
a control module for reflecting functional level requirements of each controller of a machining tool;
an SFP/TPG module for reflecting data interface level requirements; and
a common DB module for storing therein data generated, updated and referred to by the control module and the SFP/TPG module wherein the control module includes:
a setup manager for searching for a setup reference position by moving a touch probe based on geometric information of a workpiece and a jig when the workpiece is placed on the machining tool;
a decision maker for determining a sequence of workingsteps based on a diagnosis result, a monitoring result and an inspection result provided from an emergency handler, a monitor and an inspector, respectively;
an executor for converting a task sent from the decision maker into a command, delivering the converted command to an NCK/PLC, and memorizing the command performed by the NCK/PLC for an adaptive control, wherein the NCK interprets a tool-path command among commands provided from the executor and operates a servo-mechanism to perform the tool-path command while the PLC performs a machining tool command among commands provided from the executor;
a monitor for continuously monitoring the whole machining status by using a signal provided from a sensor, and transferring the monitoring result to the emergency handler or the decision maker, wherein the emergency handler diagnoses an emergency when the emergency is reported from the monitor and, then, provides the diagnosis result to the decision maker;
an inspector for performing an in-process and a post-process inspection on the machining tool by using an OMM (on-machine measurement) and delivering the inspection results to the decision maker,
a learner for analyzing the in-process inspection result received from the inspector and storing the analyzed data in the common DB module; and
a communicator for interacting with external units.

3. The STEP-NC of claim 2, wherein the executor brings the NCK/PLC a corresponding tool-path from the common DB module if the task is concerned with a machining process but brings the NCK/PLC an alternative tool from a tool magazine if the task is concerned with a tool exchanging process.

4. The STEP-NC of claim 2, wherein the machining tool command is concerned with, e.g., a tool exchange and a loading/unloading of a workpiece.

5. The STEP-NC of claim 2, wherein the external units includes a CAD/CAM system, a shop-floor control system and an operator.

6. An intelligent STEP-NC comprising:
a control module for reflecting functional level requirements of each controller of a machining tool;
an SFP/TPG module for reflecting data interface level requirements; and
a common DB module for storing therein data generated, updated and referred to by the control module and the SFP/TPG module,
wherein the SFP/TPG module includes:
an input manager for converting a CAD data inputted thereto into an internal geometric modeling kernel data, recognizing a machining feature, extracting a property value of the machining feature and storing the extracted property value of the machining feature in the common DB module;
a process planner for receiving the property value of the machining feature from the input manager, determining a process sequence, a machining task, a jig, a setup and a cutter that are required for the manufacturing of the machining feature, and storing the determined data in the common DB module;
a tool-path generator for generating a tool-path for machining and measurement by using the determined data sent from the process planner, and storing the generated tool-path in the common DB module; and
a simulator for performing a cutting simulation before an actual machining process in order to verify the generated tool-path and find possible errors therein, and, then, storing the simulation result in the common DB module.

7. The STEP-NC of claim 1, wherein the common DB module includes:
a machining feature DB for storing machining feature information;
a machine resource DB for storing information on a structure of a machine, available tools, a tool magazine, a jig and a sensor;
a machining process DB for storing a nonlinear process plan for a machining process which is expressed by using machining features, machining operations, a machining strategy, cutting parameters and cutting tools;
a machining knowledge DB for machining knowledge by interacting with an expert system;
a tool-path DB for storing a tool-path generated for a workingstep; and
an inspection DB for storing a tool-path for a measurement and a result of the measurement.

* * * * *